Figure 1:
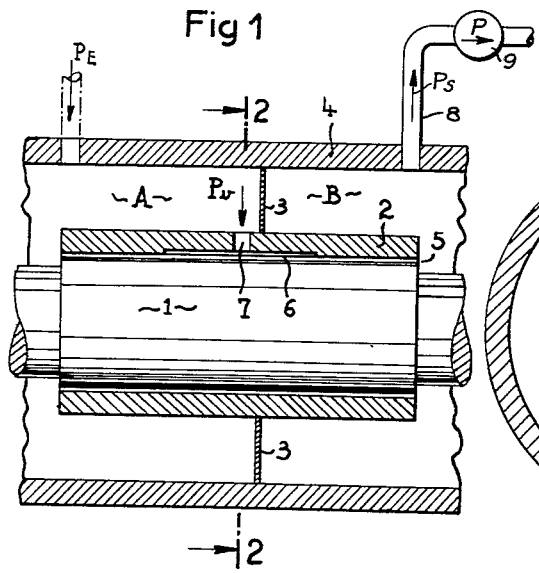

Aug. 4, 1964

A. ERTAUD ETAL 3,143,382

AERODYNAMIC BEARING

Filed May 29, 1962

INVENTORS
ANDRÉ ERTAUD
JEAN FRIBERG
PIERRE MAGINOT
BY
Bacon & Thomas
ATTORNEYS

United States Patent Office 3,143,382
Patented Aug. 4, 1964

3,143,382
AERODYNAMIC BEARING
André Ertaud, Paris, Jean Friberg, Bourg-la-Reine, and Pierre Maginot, Paris, France, assignors to Commissariat a l'Energie Atomique, Paris, France
Filed May 29, 1962, Ser. No. 198,530
Claims priority, application France June 6, 1961
5 Claims. (Cl. 308—122)

The present invention relates in general to aerodynamic bearings comprising a rotary shaft rotating in a bushing, a slight clearance being provided between these two parts, said clearance being fed with a gas under pressure which supports the movable shaft through a "gas wedge" effect similar to the "oil wedge" effect which occurs in plain oil-lubricated bearings.

These bearings have the advantage of not introducing any lubricating fluid into the machine which might be harmful, for example in certain applications in the nuclear industry, in biology and in chemistry. They thus permit very great endurance at high speeds of rotation.

Despite the relatively high production cost of these bearings, their utilisation is therefore to be recommended or even essential in numerous cases.

Nevertheless, these devices have the serious disadvantage of generating turbulence at half-speed which is a vibratory phenomenon expressed by a precession of the shaft, in the direction of the rotation, this precession beginning when the speed of the shaft reaches a certain value $\Omega$, said precession itself having the speed of rotation $$\frac{\Omega}{2}$$

the speed $\Omega$ therefore constitutes a maximum limit which practically cannot be exceeded.

In order to extend this limit, it is possible, according to a known technique, to form a fine groove (a few mm. in width and depth) equal in length to half or three quarters of the length of the bearing $$\left(\frac{L}{2} \text{ to } \frac{3L}{4}\right)$$

said groove being fed by means of an aperture of a diameter similar to the width of groove. The groove may be connected to atmospheric pressure, $P_a$, or to a higher pressure.

According to the present invention, this limit can be extended to a still higher value by effecting pumping at one end of the bearing in such a manner as to subject this end to a low pressure, the groove and the other end of the bearing being in communication with a chamber subjected to a higher pressure such as a pressure equal to or higher than atmospheric pressure.

The invention therefore relates to a bearing of the aerodynamic type comprising in combination, on the one hand a fine groove provided in the central portion of the internal surface of the stator and on the other hand pumping means permitting exhaustion to be effected at one end of the bearing in such a manner as to subject said end to a "low pressure," the groove and the other end of the bearing being in communication with a chamber subjected to a "high pressure" distinctly higher than said low pressure.

In particular, said "high pressure" may be equal to or higher than atmospheric pressure while said "low pressure" may, for example, be of the order of a few cm. of mercury.

It is then found that the resulting axial delivery of gas does not modify the lift of the bearing.

At an equal speed of rotation, the invention permits a reduction in the length of the bearings or an increase in the clearance, which facilitates the machining.

Other features will be apparent from the following description.

Figure 2:
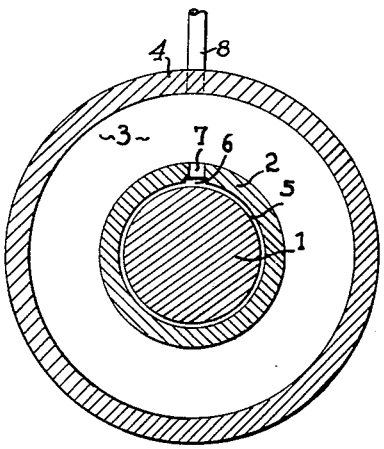
Figure 3:
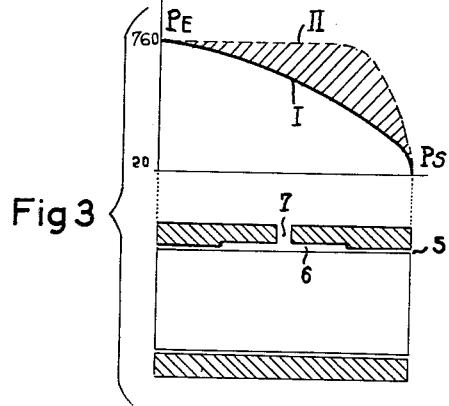

In the accompanying drawing:
FIGURE 1 is a diagrammatic view in axial section of an improved bearing according to the invention;
FIGURE 2 is a view in section along the line 2—2 of FIGURE 1, and
FIGURE 3 is an explanatory diagram of the functioning of the invention.

According to the form of embodiment illustrated, the aerodynamic bearing comprises a shaft 1 rotating in a bushing 2, carried by a partition 3 constituted by a metallic diaphragm separating the internal space in a casing 4 into two chambers A and B.

A slight clearance 5 (of the order of a few hundredths of a millimetre) is provided between the shaft and the bushing.

A fine groove 6, a few millimetres in width and depth is formed in the internal surface of the bushing, in the central portion thereof; this groove has a length of the order of half or three-quarters the length of the bearing.

This groove is in communication with an aperture 7 which is provided in the wall of the bushing and the diameter of which is of the order of the width of the groove. Said aperture is in communication with a space subjected to a pressure $P_v$ which may be equal to the atmospheric pressure $P_a$ or higher than this pressure.

One end of the clearance 5 (the left-hand end according to the drawing) is in communication with the chamber A which is subjected to a pressure $P_E$ hereinafter termed "high pressure" which may, for example, be equal to or higher than atmospheric pressure and which may, in particular, be equal to the pressure $P_v$ as assumed hereinafter.

The other end of the clearance 5 (the right-hand end according to the drawing) is in communication with the chamber B which is in communication, through a pipe 8, with the suction side of a vacuum pump 9 in such a manner that a "low pressure" $P_s$ of the order of 20 mm. of mercury, for example, prevails in said chamber.

This device functions in the following manner. It is known that the injection of a pressure $P_v$ into the groove permits a radial load to be exerted in the bearing which radial load creates a "wedge of gas" in a zone diametrically opposite to the groove and stabilises the bearing to a certain extent rendering it free from vibrations so long as the speed of rotation remains below a certain limiting speed.

For example, a bearing may be considered having a length of 200 mm., a diameter of 100 mm., a clearance (measured along the radius) of 0.03 mm., the mass of the moving member being 15 kg., and the groove and the two ends of the bearing being at atmospheric pressure; the limiting speed of rotation without vibration of this bearing will be of the order of 6,000 revolutions per minute.

If a "low pressure" $P_s$, for example of the order of 10 to 20 mm. of mercury, is caused to prevail at one end of the bearing, $P_E$ being maintained at its value of the order of one atmosphere, it is found that the limiting speed of rotation without vibration of this same bearing will be of the order of 12,000 revolutions per minute.

This phenomenon can be explained by observing that if the aperture 7 were blocked, the pressure along the bearing would decrease regularly along the bearing from the value $P_E$ to the value $P_s$; in fact it would be in the form illustrated in full lines in FIGURE 3 (curve I).

If it is now assumed that the groove 6 is brought to the pressure $P_E$ through the aperture 7, the pressure along the upper generatrix of the bearing, below the groove, will assume the course of the curve II illustrated in broken lines in FIGURE 3, while the curve of the pressure in the vicinity of the generatrix diametrically opposite to the slit will retain substantially the course of the curve I.

The difference in pressure represented by the hatched zone creates a radial load which is found, by the distribution of the pressures, to be exceptionally favourable to the stability of the bearing.

The invention is not restricted to the example of an embodiment illustrated and described which has only been selected by way of example; in particular, the application of this invention is particularly (but not exclusively) indicated in the case of machines with a vertical shaft.

What we claim is:

1. An aerodynamic bearing comprising a bushing, a rotary shaft rotating in said bushing, a slight clearance being provided between said shaft and said bushing, means for feeding gas under pressure to said clearance, the central portion of the internal surface of the bushing being provided with a fine groove, and pumping means provided to exhaust said gas at one end of said bearing by subjecting said one end to a relatively low pressure, said groove and the other end of said bearing being in communication with a chamber subjected to a pressure distinctly higher than said relatively low pressure.

2. An aerodynamic bearing as claimed in claim 1, wherein said groove has a width and a depth of the order of a few millimetres.

3. An aerodynamic bearing as claimed in claim 1, wherein the length of said groove is of the order of at least half the length of the bearing.

4. An aerodynamic bearing as claimed in claim 1 wherein the pressure of said chamber is at least equal to atmospheric pressure while the said relatively low pressure is of the order of a few centimeters of mercury.

5. An aerodynamic bearing comprising a casing, a partition dividing said casing into two chambers, a bushing mounted on said partition with its opposite ends in communication with the respective chambers, a rotary shaft mounted for rotation in said bushing, a slight clearance on the order of a few hundredths of a millimeter being provided between said shaft and said bushing, the central portion of the internal surface of said bushing being provided with a fine longitudinal groove having a width and depth on the order of a few millimeters and a length equal to at least one-half the length of said bushing, said bushing being further provided with an aperture placing said groove in communication with one of said chambers, means for supplying a gas to said one chamber at at least atmospheric pressure for application to the clearance space between said bushing and said shaft, through the respective end of said bushing as well as through said aperture, and pumping means communicating with the other one of said chambers to exhaust gas therefrom thereby applying a relatively low pressure on the order of a few centimeters of mercury to the adjacent end of said bearing.

References Cited in the file of this patent

UNITED STATES PATENTS

| | | |
|---|---|---|
| 2,827,342 | Roach | Mar. 18, 1958 |
| 2,937,294 | Macks | May 17, 1960 |

FOREIGN PATENTS

| | | |
|---|---|---|
| 1,239,798 | France | July 18, 1960 |